Patented Nov. 28, 1944

2,363,522

UNITED STATES PATENT OFFICE 2,363,522

FURNACE REFRACTORY AND PROCESS OF MAKING

Arthur F. Greaves-Walker and Robert L. Stone, Raleigh, N. C., assignors of one-sixth to Arthur B. Foster and one-sixth to Oscar Codier, both of Washington, D. C., two-sixths to said Greaves-Walker and two-sixths to said Stone No Drawing. Application December 24, 1941, Serial No. 424,358

13 Claims. (Cl. 106—68)

The present invention relates to making refractory bricks or shapes suitable as furnace linings or parts thereof, the same containing pyrophyllite as a major constituent. We have found that refractory bricks can be produced, containing pyrophyllite as the major constituent, bonded by means of a refractory clay and fired, which bricks will have an unprecedented resistance to spalling, will have practically no expansion or contraction during heating within 200° F. of its P. C. E. and will have excellent compressive strength up to these temperatures, if the pyrophyllite is properly selected and the batch of material properly made up, following the procedures set forth hereinafter.

There are several different varieties of pyrophyllite, and of these we find that usually only the "massive compact" variety of pyrophyllite is suitable. The other varieties, i. e., the foliated and the radiated granular, are generally unsuitable. Many of the deposits of foliated and radiated granular pyrophyllite contain sericite, or other potassium aluminum silicates or other silicate materials containing substantial amounts of sodium and/or potassium. Compounds of the alkali metals should be substantially absent in pyrophyllite to be used in accordance with the present invention. The presence of any substantial amount of alkaline earth compounds (e. g., silicates), in the pyrophyllite is also objectionable. The pyrophyllite we prefer to employ is any pyrophyllite that, by itself, has a softening temperature represented by pyrometric cones 28 to 30 (2900° to 3000° F.).

There is some pyrophyllite of the foliated or radiated granular varieties that can be employed satisfactorily. However, hand picking at the mine would usually be necessary, which would considerably increase the cost.

As the bonding agent, we employ in the present invention, a refractory plastic clay, which likewise, for best results should be free from (or very low in) alkali and alkaline earth metal compounds. The clay should be one which is plastic, and which has a softening temperature represented by pyrometric cone 30 or better. It is however possible to use a plastic clay having a somewhat lower softening point than this, say pyrometric 27 or 28, if the clay is used only in a small amount. Preferably the amount of the refractory plastic clay is about 8 to 35% based on the entire mixture (dry weight).

Heretofore pyrophyllite has been used extensively in the manufacture of "whiteware," i. e., dishes, tiles and similar products. For such uses, it is necessary to select pyrophyllite which is substantially free from iron stains, because during the subsequent burning operation the iron would considerably discolor the whiteware produced, giving discolored and hence low grade products. In the manufacture of whiteware, the products are vitrified or at least "semi-vitrified." This effect is produced by a partial fusion of materials constituting components of the mix from which the whiteware is being made. The fusible components or fluxes present in the raw mix usually consist very largely (at least) of alkali metal compounds and alkaline earth metal compounds. (In the present case, magnesium is included with the alkaline earth metals, since magnesium compounds in the mix, so far as fluxing action is concerned, behave about like calcium compounds.)

The presence of iron however in small amounts, is not in any way objectionable in the present invention, and we can use a grade of material which would be rejected by the whiteware industry, and accordingly the massive compact pyrophyllite, more or less stained with iron (but sufficiently low in fluxing components including alkalies and alkaline earths), which is perfectly satisfactory for use in the present invention, costs less than the white mineral which is iron free.

Certain other grades of pyrophyllite are used as a rubber filler or as a filler in resin plastics and in other services, where a perfectly white material is necessary. Pyrophyllite, that is stained by humic acid and other organic compounds, is not suitable as a filler, but is entirely satisfactory in our invention.

Our researches have demonstrated that pyrophyllite, to be suitable for the manufacture of high grade refractories, should be substantially free from alkali compounds and from alkaline earth metal compounds (and we use this latter term, in the specification and in the claims, to include calcium and magnesium compounds). Preferably not more than traces of these should be present. Likewise the other components of the mix (including the clay) should not contain excessive amounts of the alkali and/or alkaline earth compounds (e. g., as silicates and/or double silicates).

Accordingly we select the massive compact pyrophyllite which is wholly free (or substantially free) from such impurities as sericite, feldspar, talc and mica, and such materials should not be present, to any considerable extent, in any of the components added, as binders, modifying agents, etc.

It might have been supposed that some of the hard dense silicates, e. g., potash feldspar, soda feldspar, lime feldspar, or the like, added to the pyrophyllite (or to the mix containing this) would be useful in raising the hardness and density and strength of the brick produced by firing, but we have demonstrated that bricks made from a pyrophyllite mixture containing a refractory plastic clay binder and some added feldspar, are of very inferior quality, being only suitable for use in parts of furnace installations where very high temperatures (i. e., above cone 8 or 2300° F.) are not encountered. This is because these substances, if present or added, would act as fluxes.

Accordingly an important object of the present invention is the provision of refractory bricks and furnace linings or parts thereof having a high P. C. E. (at least cone 28 or 2939° F.) and the ability to withstand terrific loads up to just below their softening point. As an example, a pyrophyllite brick made according to our invention was tested along side of a brick reputed to be among the best load-bearing fireclay brick made. Both were loaded with 50 lbs. per sq. in. and fired to 2500° F. The pyrophyllite brick remained absolutely stable (i. e., did not shrink or expand, and kept its shape), while the other brick was deformed nearly 10 per cent. No fireclay brick heretofore known will withstand such a heavy load at 2500° F. or above. The term "fireclay brick" is used in the art as substantially synonomous with "aluminous refractories."

A further important object is the production of bricks, (shapes) that have an extremely high resistance to thermal shock, and an unprecedented resistance to slag erosion.

One of the most remarkable properties of our pyrophyllite refractories is their resistance to thermal shock. They can be used as a lining for ladles into which molten metal is poured, for crucibles for melting metals, etc., where the thermal shock is terrific.

As an example of the remarkable stability of the pyrophyllite bricks, several bricks of pyrophyllite, made as described herein, were placed in a test panel with other aluminous bricks reputed to have exceptional resistance to spalling. After 20 cycles in the standard spalling test (A. S. T. M., 1940), the pyrophyllite bricks made according to the present invention showed absolutely no change while the other bricks had lost an average of 30.0% by weight.

A very satisfactory pyrophyllite, of the compact massive variety (which lost on ignition 3.33%) had the following analysis (dry basis).

| | Per cent |
|---|---|
| $SiO_2$ | 76.4 |
| $Al_2O_3$ | 20.05 |
| $Fe_2O_3$ | 0.13 |
| $CaO+MgO$ | Traces |
| $K_2O$ | 0.05 |
| $Na_2O$ | 0.21 |

The following seem to be the limits of permissible variation in the pyrophyllite, while giving high grade refractories, under the present invention.

| | Per cent |
|---|---|
| $SiO_2$ | 65 to 80 |
| $Al_2O_3$ | 18 to 29 |
| $Fe_2O_3$ | 0 to 3 |
| $CaO+MgO$ | 0 to 1 |
| $K_2O+Na_2O$ | 0 to 1.5 |

We note here that, even when the alkali content is very low, the alkaline earth content (figured as oxides) must be below 1% and even when the alkaline earth content is very low, the alkali content (figured as oxides) must be below 1.5%. And this applies to the entire mix (pyrophyllite and clay or pyrophyllite, quartz and clay) from which the bricks are to be made.

It is far preferable to use pyrophyllite and clay in which the total alkali plus alkaline earth content (figured as oxides) is below 1.5% and even preferably below 1%.

In making the mix for molding shapes from the pyrophyllite and binder, free silica such as quartz can be present, if desired, up to 40% of the entire batch. If such silica is to be added, it should be free or substantially free from alkalies and alkaline earths. It can be pulverized or granulated and so added. Even when present in amounts approaching 40%, it does not seriously lower the P. C. E. and does not impair the very high load-bearing capacity of the shapes (bricks, etc.). Practically all pyrophyllite, as mined, contains quartz, which, for the above reason does not have to be removed. In the use of pyrophyllite for making some grades of whiteware, it is necessary to remove the quartz. In fact, in our present invention, as stated, some quartz can be added, to improve the refractory. The more quartz there is present in the pyrophyllite brick, the more resistant will the brick be against acid slag erosion.

Any iron present initially as FeO quickly becomes converted into the ferric state. As such it behaves somewhat similarly to aluminum (both amphoteric) and hence (if not present in excessive amounts) does no harm, in these refractories. But large amounts of iron oxide (above 3%) would constitute a flux and hence would be objectionable.

Some deposits of pyrophyllite also contain titanium oxide, which, if present in any large amount (e. g., 4%) would have a fluxing action. The amount of $TiO_2$ in the pyrophyllite to be used in the present invention, should be not above 1.5%. In most cases the amount of titanium oxide present in the pyrophyllite will be substantially less than this. In fact, the titanium is usually so small that it can be disregarded.

Thus, it will be seen, the entire content of fluxing materials should be low, i. e., as follows, not over the following (calculated in all cases as the oxides):

| | Preferable | Maximum |
|---|---|---|
| | Per cent | Per cent |
| $Na_2O+K_2O$ | Below .6 | 1.5 |
| $CaO+MgO$ | Below .4 | 1 |
| $Fe_2O_3$ | Below .5 | 3 |
| $TiO_2$ | Below 1.0 | 3 |

Materials having not more than the above amounts of fluxing constituents are available, without any extensive hand sorting, at the mine.

The invention in its broader aspects is not restricted to the use of particular proportions of different selected grain sizes, in the components of the mixture, nor to the employment of particular proportions of components, nor particular modes of forming bricks, and for the purpose of illustration, the following is given by way of example.

All properties of a refractory may be varied by adjustment of the grain sizes (in the batch from which the product is to be molded) and by proper proportioning of various grain sizes. As an example, a brick having only one size of particles will have an open structure and will resist spalling better than a denser brick. A very strong brick (as regards compression) can be made from a mix containing approximately 60.2% pyrophyllite passing a 10 mesh screen, retained on a 20 mesh, 8.6% passing a 28 mesh, retained on a 48 mesh, and 17.2% passing an 80 mesh screen, together with 14.0% clay. But we wish to make it clear that we do not restrict the invention to any particular screen analysis. The example here given gives a very satisfactory brick, but for other purposes we would use a mix having more coarse material (or material coarser than or smaller than stated in the above screen analysis) for making a less dense brick, etc.

The clay need not be crushed or ground to any specific grain size; however, most satisfactory results in the mixing operation will be obtained with clay that has been pulverized to pass 35 mesh. The material known as "pulverized clay" is satisfactory, but the clay when used should not be larger than 20 mesh in order to obtain good distribution in the mix. The clay substance (that is, the clay minerals of the kaolinite family that give plasticity and strength to the mix) should all or nearly all, pass 120 mesh after being slaked in an excess of water. Two extremes are given in the following table. These mixtures were mixed with 4% of water (based on the air dry weight of the mix) and pressed into bricks at a pressure of from 2,000 lbs. per sq. inch upward. Using 4% of water constitutes an example of "dry press" process as mentioned below.

| Material | I | II |
|---|---|---|
| Pyrophyllite through 10 on 20 mesh............per cent.. | 60.2 | 25.8 |
| Pyrophyllite through 28 on 48 mesh............do.... | 8.6 | 0.0 |
| Pyrophyllite through 80 mesh............do.... | 17.2 | 60.2 |
| Bonding clay through 40 mesh............do.... | 14.0 | 14.0 |
| Compressive strength (unfired)............lbs. per sq. in.. | 2,200 | 800 |

Bricks made from each of these mixtures (and with the chemical analysis indicated above) will have zero shrinkage at cone 17 (2680° F.), will withstand loads of 50 lbs. per sq. in. at 2500° F. without failure and without distortion and will have a P. C. E. of cone 31 (3050° F.). We found that, for dry pressed refractories, the clay should constitute 10 to 30% of the entire mixture, with 14 to 20% being best. Less than 10% does not give sufficient strength unless firing temperatures beyond the commercial range are used, while more than 30% increases the cost and sometimes changes the physical qualities. We prefer to use not over 25% of clay, but in some cases can go up to 30%. In most cases, the preferred amount of clay is not above 20%. It will be noted accordingly that the clay (binder) is always a minor component of the entire mass.

One of the particular features of one modification of our invention is the manner in which the pyrophyllite and clay are mixed in the dry press process. All grain sizes of the pyrophyllite and the clay can be mixed dry and then the desired amount of water (about 4.0 to 5.0%) mixed in. We prefer to weigh out the coarse grains (e. g., minus 10 on 20 mesh) and add all of the water to this. The remaining pyrophyllite and the clay are then mixed together dry. This mixture is then added to the moistened coarse material, mixed and pressed. By mixing the ingredients in this manner, a much more homogeneous mass is produced than can be obtained by any method of mixing heretofore known in the art.

The same mixes can be used in the stiff mud repress and soft mud processes of forming bricks, increasing the water to approximately 15.0 to 20.0%. Dispersing and flocculating agents such as bases and acids, and organic bonding agents such as sulphite pitch, gums, molasses and the like, may be incorporated in the manufacture of pyrophyllite refractories to give added workability and dry strength. But preferably these are not used except in small amount, and these are preferably free from or low in fluxes. The clay to be used in the stiff mud or soft mud processes need not be finer than 10 mesh because it will slake down and be thoroughly dispersed in the mixing and forming processes.

We have found that the bricks should be fired to pyrometric cones 10 to 18, in order to produce a sufficiently hard product to withstand transportation.

Artificially purified pyrophyllite can be employed in the manufacture of pyrophyllite refractories, but the cost is at present prohibitive and the improvement of desirable properties, if any, do not warrant its general use.

The present invention provides a use for a particular grade of pyrophyllite which has not heretofore been extensively used for any purpose, being unsuitable in whiteware, which seems to have been the principal commercial use of this material in the ceramic industry.

In carrying out a preferred modification of the process, the pyrophyllite of the kind referred to above, is comminuted, for example to pass a 10 mesh screen, although we do not restrict ourselves to this screen size. The comminuted pyrophyllite may be subjected to screening and grain size selection if desired, as indicated above. The plastic clay, in a finely powdered condition (as above indicated), dry, then may be added to the medium size and fine size comminuted pyrophyllite and well mixed, for example in a cement mixer, dry. The coarse grain pyrophyllite is then moistened. The dry mixture of medium and fine grains of pyrophyllite and clay then can be thoroughly mixed in with the moistened coarse grains. The so moistened mass is then well mixed, and is molded, preferably under high pressure such as 2000 pounds to 8000 pounds, more or less, per square inch. The molded bricks are then dried and are fired in the usual manner.

The firing can be conducted by any suitable method, for example by first air-drying at room temperature for one or more days, then drying the bricks, say at 150 to 200° F. for a suitable time (e. g., 24 to 48 hours), then heating slowly to cone 8 (2200° F.) during 14 hours, then heating to cone 14 (2500° F.) during a further 18 hours, and (if desired) continuing the heating to cone 16 (2640° F.) during a further 19 hours. The atmosphere of the kiln may be oxidizing or reducing, or can vary during different stages of the heating.

Bricks made according to the invention possess the remarkable property of fast drying. They can be taken directly from the press and dried at 250° F. without disruption. They are then ready to be fired as above.

The fired bricks are then allowed to cool slowly (say during 2–5 days), and are then ready for shipment or for being installed in a furnace.

It is of course possible to use much more water than the 5% indicated, to produce a wet molding mixture, which is made into bricks, dried and burned or fired as indicated above.

In referring herein to bricks, it will be understood that this term is used in a generic sense and is not restricted to blocks of a particular size, or blocks in which every cross-section is rectangular. The term is used to embrace shaped articles generally which are used as refractories or in making refractory linings, as well as bridges, arches, etc., in furnaces.

It will be understood that the mixture referred to above can also be used (preferably in a more finely ground condition) mixed with water in amount to make a mortar-like mass, as a cement in laying up walls of the refractory blocks. For this purpose it is advisable to use quantities of the refractory plastic clay approaching 20% or 35%. To 100 lbs. of the dry mix, 30 to 40 lbs. water can be used.

These mixtures are also suitable for making an excellent plastic refractory for a ramming mix or for other patching, by using larger grains of pyrophyllite, for example, grains as large as one-quarter inch.

It will be apparent that in making whiteware, the fluxes (either those naturally present in the components of the mix, and/or the fluxes added for the purpose) by their fusion or partial fusion or by combination with other components of the mix to give fusible compounds, during the heating or firing of the whiteware, effect the vitrification or partial vitrification of the whiteware. It will be understood that, during ordinary firing (which generally is carried up to between about cone 8 and cone 11) the desired degree of vitrification for hotel china is effected. And it will be understood that if the vitrified whiteware or the molded whiteware batch without previous vitrification, be heated to a temperature which is several cones above the vitrification temperature for that particular material, the material will soften considerably, to become mushy and easily deformable.

In the step of vitrifying whiteware, the temperature at which vitrification can be accomplished depends upon the mix and particularly upon the nature and amount of fluxes present therein. The so called "refractory porcelain" is a type of whiteware which has a relatively small amount of fluxes, and which is usually fired at a relatively high temperature, usually several cones above the temperature necessary for effecting satisfactory vitrification of table ware (i. e., dishes for the dining table).

One of the large uses of refractory porcelain is for the insulator elements of the spark plugs of internal combustion engines. But such elements are not called upon to resist a continued high heat. High grade spark plug insulators may have a P. C. E. value of around 26—27, which is very satisfactory. Such insulators are invariably vitrified, and also are invariably glazed, after being vitrified. No commercial spark plug porcelain known to us, has a P. C. E. above 27.

Refractory bricks for high temperature furnace linings, are not to be confused with whiteware nor with refractory porcelains. Three important differences are that (1) refractory bricks are never vitrified, (2) refractory bricks are never glazed, and (3) refractory bricks must have a P. C. E. value of 28 or above. These three differences, in the present invention, are accomplished by the low content of fluxes (including in particular alkalies and alkaline earths), which low flux content renders the mixes unsuitable for making whiteware or refractory porcelain (except by adding fluxes).

There are other important differences, in addition to the specified low flux content. Thus in making whiteware (including all types of porcelain) it is necessary to reduce all the components of the mix to an extremely fine condition (e. g., 200 mesh), and to form the same into well blunged slip (mud or paste). On the contrary in the present invention we prefer to have a substantial part of the pyrophyllite (and optionally of the flint etc. if present) in the form of coarse grains which will be retained on a screen of 20 mesh (or screen of some mesh at least coarser than about 30), the amount of coarse materials and the grain sizes thereof, are varied depending on the results sought.

It will further be understood that while spark plug porcelains are hard, they would not withstand pressure at sustained temperatures of 2500° F. without considerable deformation, and they are more sensitive to thermal shock than are refractory bricks. This is because the fluxes which produce the vitrification of the porcelain, in the usual firing range, will cause further softening at temperatures a few cones above the vitrification range, allowing some deformation under load, and at still higher temperatures (but below cone 28) the entire mass would further soften and would slump of its own weight.

Among the flux components commonly added in the making of porcelain (including high grade porcelain and so called "refractory porcelain" such as the spark plug porcelain), we mention feldspar, mica, calcareous marl, whiting, basalt, talc, magnesite, dolomite, marble, chalk, and various other minerals having a high content of alkali and/or alkaline earth metal compounds. Heretofore where pyrophyllite has been used as a component of a porcelain raw mix, the pyrophyllite has usually contained some sericite (a potash mineral). The fluxes were of course usually needed to supplement the alkali and alkaline earth compounds in the other components of the porcelain raw mix. In the present invention we do not add fluxes and we purposely select components which are substantially free from fluxes, because we not only do not wish to accomplish vitrification, but we must prevent vitrification.

We stated above that the alkali metal compounds present in our mixes, should be (calculated as oxides) below 1.5%. In a particular test to demonstrate this, a mix was made up, of pyrophyllite and ball clay, of the following composition:

|  | Clay | Pyrophyllite |
| --- | --- | --- |
| $SiO_2$ | 51.65 | 80.05 |
| $Al_2O_3$ | 31.24 | 15.56 |
| $TiO_2$ | 1.72 | .12 |
| $Fe_2O_3$ | 1.17 | .09 |
| CaO | .20 | .16 |
| MgO | .50 | .20 |
| $K_2O$ | .36 | 1.39 |
| $Na_2O$ | .58 | .20 |
| Ignition loss | 12.13 | 2.35 |

9 parts of this pyrophyllite and 1 part of this clay were mixed, ball milled for 2 hours with 55% of water, to give a thoroughly blunged slip, dried to a consistency suitable for dry pressing, and granulated. This was all done as in the porcelain industry. Portions of this were made into cylinders about 2 inches long with a cross-sectional area of exactly one square inch. These were then carefully dried at 200° F.

Several of these were fired, placed vertically, some at cone 10 and some at cone 17, (2680° F.), all for 27 hours, without being weighted. Other samples were fired, at these same temperatures (also placed vertically), weighted with 25 lbs. on their tops (i. e., 25 lbs. per square inch). These tests gave the following results:

Linear shrinkage during drying _____ Nil
Linear firing shrinkage, heating to cone 10
 (2280° F.) _____per cent__ 2.10
Linear firing shrinkage, heating to cone 17
 (2680° F.) _____do____ 6.0
Load test deformation, heating to cone
 10 _____do____ .75
Load test deformation, heating to cone
 17 _____do____ 14.70
Absorption after firing at cone 10___do____ 11.05
Absorption after firing at cone 17___do____ .07
Softening temperature (P. C. E.) _____ Cone 20

Heating to cone 10 did not vitrify the product, but heating to cone 17 did give full vitrification, and excessive softening (shown by the load test deformation). Tests showed that about cone 15—16 would be sufficient for proper vitrification.

Here a mix was made up containing 1.525% of Na2O+K2O (i. e., just barely over 1.5% given above as the maximum). This product would be wholly useless as a refractory brick (refractory bricks must have a P. C. E. value at least 28), and also as showing the excessive deformation (14.7% under 25 lbs. per sq. in. at cone 17). Our refractory bricks as stated above will not deform at all at similar temperatures even under double this load.

These tests showed that although the above mix would be usable for making spark plug porcelain (of fair grade) it would be wholly unsuitable for making refractory bricks, and it would have been equally unsuitable had the grain sizes recommended herein, been used therein.

It will be noted that in the above tests, the Na2O+K2O was just barely over the 1.5% (maximum under our specifications) the CaO+MgO in the mix was only 0.394%, or well below half the 1% maximum permissible under our specification).

The above tests are cited to show that the above statement that the total Na2O+K2O must be kept below 1.5%, is important in the refractory brick art, but not in the porcelain (whiteware) art, where vitrification is necessarily effected.

From the above tests it will be shown that any discussion of using pyrophyllite in a refractory brick, without a statement of the flux content (particularly alkali content and alkaline earth content) is of no value, and the futility of adding feldspar or other fluxes to pyrophyllite, for use in making refractory bricks, will be seen.

While we have stated that we prefer to have a substantial part of the pyrophyllite, used in making the bricks, coarse enough to be held on a 20 mesh screen, we do not restrict the scope of the invention to that degree of coarseness. But in making bricks, we prefer, in all cases to use some part of the pyrophyllite (and preferably a major portion) coarse enough to be held on a 30 mesh screen.

In crushing the pyrophyllite, a considerable amount of very fine material is always produced, and usually more of the fine than is to be used in the bricks. A part of this fine material can, if desired, be mixed with clay and made into a paste or mortar by adding water, for use in laying up the bricks. The amount of clay in the dry mix for making such mortar can be 25 to 40%, based on the dry mixture.

For making this into a mortar for spreading between the bricks, 100 pounds of the mixture can be mixed with 30 to 40 pounds of water. For giving a thinner (more fluid) mixture, for dipping the bricks into, 100 pounds of the mixture can be mixed with 60 to 70 pounds of water.

It is to be understood that here also, the plastic clay and the powdered pyrophyllite are substantially free from fluxing agents.

The present invention is in part a continuation of our copending application Serial No. 205,792, filed May 3, 1938.

We wish to call attention to the fact that after firing the bricks, and indeed after the bricks have been in use in a furnace for long periods, the coarse grains of pyrophyllite remain as coarse grains. Since there is no vitrification of the bricks, either during firing or later during continued use (at not above the P. C. E. value of the bricks), the coarse grains do not pulverize and/or become blended into the remaining components of the mix.

We claim:

1. A non-vitrified refractory brick composed essentially of a burned shaped mass of pyrophyllite and refractory clay bonding agent, which mass is free from any such amounts of alkali metal compounds and alkaline earth metal compounds as would cause vitrification of said bricks upon heating to cone 28, such refractory containing a substantial proportion of the pyrophyllite in the form of particles coarser than 30 mesh, and the amount of the pyrophyllite being several times greater than the amount of the clay, such refractory brick being suitable as linings in high temperature furnaces, and having a P. C. E. value not below cone 28.

2. A non-vitrified refractory brick containing comminuted pyrophyllite of the massive compact variety, silica, and plastic refractory clay, said clay being in amount which is only a minor fraction of the amount of the pyrophyllite, such brick being composed of a mixture in which the total alkali metal compounds are substantially below 1.5% and the total alkaline earth metal compounds are substantially below 1%, both figured as oxides and both figured on the dry basis, and in which brick a substantial proportion of the pyrophyllite is coarser than 30 mesh, and the clay in said mix constituting the binder, and such refractory brick being suitable as linings in high temperature furnaces, and said brick having a P. C. E. value not below cone 28, and such brick not being vitrifiable by heating to cone 28.

3. A mixture composed essentially of massive compact pyrophyllite and a refractory plastic clay bonding agent, the amount of the pyrophyllite being substantially greater than the amount of the clay, and the total amount of alkali metal compounds present in such composition being substantially below 1.5%, calculated as oxides, and the total amount of alkaline earth metal compounds present in such composition being substantially below 1%, calculated as oxides, both figured on the dry basis, and such material, after moistening, molding and drying having a P. C. E. equal to at least cone 28, and such product being suitable for use in linings in high temperature furnaces.

4. A refractory shaped furnace lining brick, composed essentially of a shaped burned mass of massive compact pyrophyllite and a refractory plastic clay bonding agent, the amount of the clay being about 10% to 30% of the mass, and the total amount of alkali metal compounds present in such product being not over 0.6% calculated as oxides, and the total amount of alkaline earth metal compounds present therein being not over 0.4%, calculated as oxides, both figured on the dry basis, and such refractory brick having a P. C. E. equal to at least cone 28.

5. A refractory brick containing comminuted pyrophyllite of the massive compact variety, and about 10% to 30% of plastic refractory clay, the sum of total amount of alkali metal compounds present therein and the total amount of alkaline earth compounds in said material, calculated as oxides, being not over 1.5% in all, and such refractory brick having a P. C. E. equal to at least cone 28.

6. A refractory brick containing comminuted pyrophyllite of the massive compact variety, silica, and plastic refractory clay in the amount of 10% to 30%, the combined amounts of alkali metal compounds and of alkaline earth metal compounds together, in the said materials, calculated as oxides, being not over 1%, such refractory brick being suitable as linings in high temperature furnaces, and having a P. C. E. equal to at least cone 28.

7. A refractory brick composed substantially entirely of a mixture of clay and massive compact pyrophyllite containing such amounts of iron as to stain the same, the amount of the clay being substantially less than the amount of the pyrophyllite, the total alkali metal compounds in said entire mixture, figured as oxides, on the dry basis, being substantially below 1.5% and the total alkaline earth compounds in the entire mixture, calculated as oxides on the dry basis, being substantially below 1%, and the shaped products being sufficiently refractory to be useful as furnace linings in high temperature furnaces, and being capable of being heated without substantial distortion or shrinkage or vitrification, to a temperature of 2680° F., and such refractory brick having a P. C. E. equal to at least cone 28.

8. A refractory shaped product composed substantially entirely of clay and massive compact pyrophyllite containing such amounts of iron as to stain the same, the pyrophyllite constituting the major part of the entire mass, and quartz, the amount of said clay being only a minor fraction of the amount of the pyrophyllite, the total alkali metal compounds present in said product, figured as oxides, on the dry basis, being below 1.5%, and the total alkaline earth compounds present in the entire product, calculated as oxides, on the dry basis, being below 1%, and the shaped products being sufficiently refractory to be useful as furnace linings in high temperature furnaces and said shaped product having a P. C. E. equal to at least cone 28, and being capable of being heated, without substantial distortion or shrinkage or vitrification, to a temperature of 2680° F.

9. A refractory brick composed essentially of a shaped burned mass of massive compact pyrophyllite, and a refractory plastic clay bonding agent, the amount of the pyrophyllite being several times greater than the amount of the clay, a substantial portion of the pyrophyllite being, when introduced into the mixture, of coarser grain size than 30 mesh, and the total alkali metal compounds present in said product, calculated as oxides, being below 1.0% and the total alkaline earth compounds present therein, calculated as oxides, being not over 0.6%, such refractory brick being suitable as linings in high temperature furnaces, and said refractory brick having a P. C. E. at least as high as cone 28.

10. A refractory brick composed essentially of a shaped burned mass comprising massive compact pyrophyllite bonded by a refractory plastic clay, the amount of the clay being only a minor fraction of the amount of the pyrophyllite, and the total alkali metal compound present in said product, calculated as oxides being below 1.0%, and the total alkaline earth metal compounds present in said product, calculated as oxides, being below 0.6%, such refractory brick being suitable as linings in high temperature furnaces, and having a P. C. E. value above cone 28, said refractory brick being composed, in large part at least, of a mixture of clay and pyrophyllite in which the clay constitutes the binder, and in which brick a substantial part of the pyrophyllite is coarser than 30 mesh, and another part of the pyrophyllite being at least as fine as 80 mesh, and such brick being capable of being heated to cone 28 without becoming vitrified.

11. A process of making refractory shapes which comprises dividing comminuted pyrophyllite into three sizes of grains, namely coarse, medium and fines, mixing the said medium and fines with fine pulverized refractory plastic bonding clay, while all three are in a dry condition, adding water to the coarse grains of the pyrophyllite in amount sufficient for the production of a dry-pressing mix, and then thoroughly mixing the so moistened coarse grains with the dry mixture containing the medium and fine pyrophyllite grains and clay, pressing the mixture at high pressure into shapes, drying and firing the same, the total alkali metal compounds in the mixture, calculated as oxides, on the dry basis, being not over 1.5% and the total alkaline earth compounds in the mixture, figured as oxides, on the dry basis, being below 1%, the amount of said pyrophyllite being a major fraction of the entire composition, and the amount of said clay being a minor fraction only of the amount of said pyrophyllite.

12. A process of making refractory shapes which comprises dividing comminuted pyrophyllite into three sizes of grains, namely coarse, medium and fines, said coarse material being of a grain size to substantially all pass a 10 mesh screen and to be substantially all retained on a 20 mesh screen, said fines substantially all passing an 80 mesh screen and said medium material being of a grain size intermediate said coarse and said fine, mixing the said medium and fines with fine pulverized refractory plastic bonding clay, said clay substantially all passing a 35 mesh screen, while all three are in a dry condition, adding water to the coarse grains of the pyrophyllite in amount sufficient for the production of a dry-pressing mix, and then thoroughly mixing the so moistened coarse grains with the dry mixture containing the medium and fine pyrophyllite grains and clay, pressing the mixture at high pressure into shapes, drying and firing the same, the total alkali metal compounds in the mixture, calculated as oxides, on the dry basis, being not over 1.5% and the total alkaline earth compounds in the mixture, figured as oxides, on the dry basis, being below 1%, the amount of said pyrophyllite being a major fraction of the entire composition, and the amount of said clay being a minor fraction only of the amount of said pyrophyllite.

13. A process of making refractory shapes which comprises dividing comminuted pyrophyllite into three sizes of grains, namely coarse, medium and fines, said coarse being about 25 to 60 parts and of a particle size to substantially all pass a 10 mesh screen and to be substantially all retained on a 20 mesh screen, said medium being not considerably over 8.6 parts and of a particle size to substantially all pass a 28 mesh screen and to be substantially all retained on a 48 mesh screen, and said fines being about 17 to 60 parts and substantially all passing an 80 mesh screen, mixing the said medium and fines with fine pulverized refractory plastic bonding clay, said clay being between 10% and 25% of the entire batch and substantially all passing a 35 mesh screen, while all three are in a dry condition, adding water to the coarse grains of the pyrophyllite in amount sufficient for the production of a dry-pressing mix, and then thoroughly mixing the so moistened coarse grains with the dry mixture containing the medium and fine pyrophyllite grains and clay, pressing the mixture at high pressure into shapes, drying and firing the same, the total alkali metal compounds in the mixture, calculated as oxides, on the dry basis, being not over 1.5% and the total alkaline earth compounds in the mixture, figured as oxides, on the dry basis, being below 1%.

ARTHUR F. GREAVES-WALKER.
ROBERT L. STONE.